US011681600B2

(12) United States Patent
Savir et al.

(10) Patent No.: US 11,681,600 B2
(45) Date of Patent: Jun. 20, 2023

(54) TEST SYSTEM FOR DATA STORAGE SYSTEM PERFORMANCE TESTING

(71) Applicant: EMC IP Holding Company LLC, Hopkinton, MA (US)

(72) Inventors: Amihai Savir, Sansana (IL); Shay Katz, Alon-Shvut (IL); Michael Timmy Opachevsky, Beer Sheva (IL); Daniel Shapira, Beer Sheva (IL); Gal Uzan, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 79 days.

(21) Appl. No.: 17/386,837

(22) Filed: Jul. 28, 2021

(65) Prior Publication Data
US 2023/0039048 A1 Feb. 9, 2023

(51) Int. Cl.
*G06F 11/00* (2006.01)
*G06F 11/30* (2006.01)
*G06F 11/34* (2006.01)

(52) U.S. Cl.
CPC ...... *G06F 11/3075* (2013.01); *G06F 11/3034* (2013.01); *G06F 11/3409* (2013.01); *G06F 11/3447* (2013.01)

(58) Field of Classification Search
CPC ............. G06F 11/3034; G06F 11/3075; G06F 11/3409; G06F 11/3447
See application file for complete search history.

(56) References Cited

U.S. PATENT DOCUMENTS

| | | | |
|---|---|---|---|
| 2015/0317563 A1* | 11/2015 | Baldini Soares | G06N 5/04 706/12 |
| 2019/0044825 A1* | 2/2019 | Vijayakumar | H04L 41/14 |
| 2019/0079940 A1* | 3/2019 | Krishnan | G06F 16/119 |
| 2019/0277913 A1* | 9/2019 | Honda | G01R 31/2894 |
| 2019/0340095 A1 | 11/2019 | Faibish et al. | |
| 2019/0340459 A1 | 11/2019 | Faibish et al. | |
| 2020/0242000 A1 | 7/2020 | Khosrowpour et al. | |
| 2020/0257539 A1 | 8/2020 | Borlick et al. | |
| 2021/0223963 A1 | 7/2021 | Ferreira et al. | |
| 2022/0100632 A1* | 3/2022 | Kulkarni | G06F 11/302 |
| 2022/0229768 A1* | 7/2022 | Martin | G06F 11/3692 |
| 2022/0309389 A1* | 9/2022 | Zivkovic | G06F 11/3419 |

\* cited by examiner

*Primary Examiner* — Elmira Mehrmanesh
(74) *Attorney, Agent, or Firm* — BainwoodHuang

(57) ABSTRACT

In performance testing a data storage system, operating parameters and performance data are recorded as the system executes performance tests over a test period, where the performance data includes measures of a performance characteristic (e.g., latency) across a range of I/O operation rates or I/O data rates for each performance test. Subsets of recorded operating parameters and performance data are selected and applied to a machine learning model to train and use the model, and the model provides a model output indicative for each performance test of a level of validity of the corresponding performance data. Based on the model output indicating at least a predetermined level of validity for a given performance test, the performance data for the performance test are incorporated into a record of validated performance data for the data storage system, usable for benchmarking, regression analysis, hardware qualification, etc.

20 Claims, 7 Drawing Sheets

TEST SYSTEM FOR DATA STORAGE SYSTEM PERFORMANCE TESTING

BACKGROUND

The invention is related to the field of data storage system performance testing.

SUMMARY

A method of performance testing a data storage system is disclosed that includes recording operating parameters and performance data of the data storage system as it executes a plurality of performance tests over a test period, the performance data including one or more measures of a performance characteristic across a range of I/O operation rates or I/O data rates for each of the performance tests. Subsets of recorded operating parameters and performance data are selected and applied to a machine learning model to train the model and to use the model as trained, the model providing a model output indicative for each performance test of a level of validity of the corresponding performance data. Based on the model output indicating at least a predetermined level of validity for a given performance test, the performance data for the performance test are incorporated into a record of validated performance data for the data storage system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Performance testing involves executing performance tests and analyzing/using test results in any of a variety of ways. Major types of testing areas include:

Regression—Testing key performance indicator (KPI) configuration (hero numbers) on each official promoted build and comparing to verified results using a general or special-purpose analysis tool in order to track regression.

Build Promotion Testing (BPT)—Running test on committed builds from developers to verify performance impact before promotion to production release Operation Testing—Testing various scenarios that can have an impact on performance
  HA—High Availability events
  NDU—Non-Destructive Upgrade
  REBUILD—RAID rebuild process In the above scenarios appliance behavior is measured by monitoring various performance aspects in different levels of storage architecture and infrastructure: Datapath, Frontend, Backend, Hosts, switches, etc.

More generally, performance testing is essential for any product in its development cycle, but the collection and analysis of test results presents challenges, especially as systems become more complex and generate increasing amounts of test result data. Typically the results of each test must be reviewed and flagged as either True/Valid for a valid test or False/Invalid for an invalid test. This review presents a substantial bottleneck in testing throughput, and moreover requires experienced technical personnel. As described more below, a performance test result can be expressed as a graphical curve, and one way of understanding the review process is that it aims to determine whether a given test result curve sufficiently resembles a valid performance curve.

Thus in brief summary, conventional testing approaches exhibit the following drawbacks that place limits on test throughput and accuracy:

Manual analysis—as the development of automation processes, more and more test results are produced, and an experienced test engineer is needed to review test results to assess whether the test passed or failed.

Time consuming—The process is slow, partly due to the need to check that tests were performed correctly (no system problems or test errors/glitches) and to compare for regression.

Human error—There is the potential for human error, as there are many factors that should be considered while analyzing performance test output.

To address the above issues of conventional testing techniques, a disclosed testing system and method employ machine learning technology. A key problem as described above is to differentiate valid/passing test results from invalid/failing results. The disclosed system and method leverage machine learning and use novel features developed to fully automate performance testing to increase assessment quality and reduce overall testing time. Assessment quality is improved in part by using features selected to promote accurate differentiation of valid performance test results from invalid performance test results.

Embodiments

Figure 1:
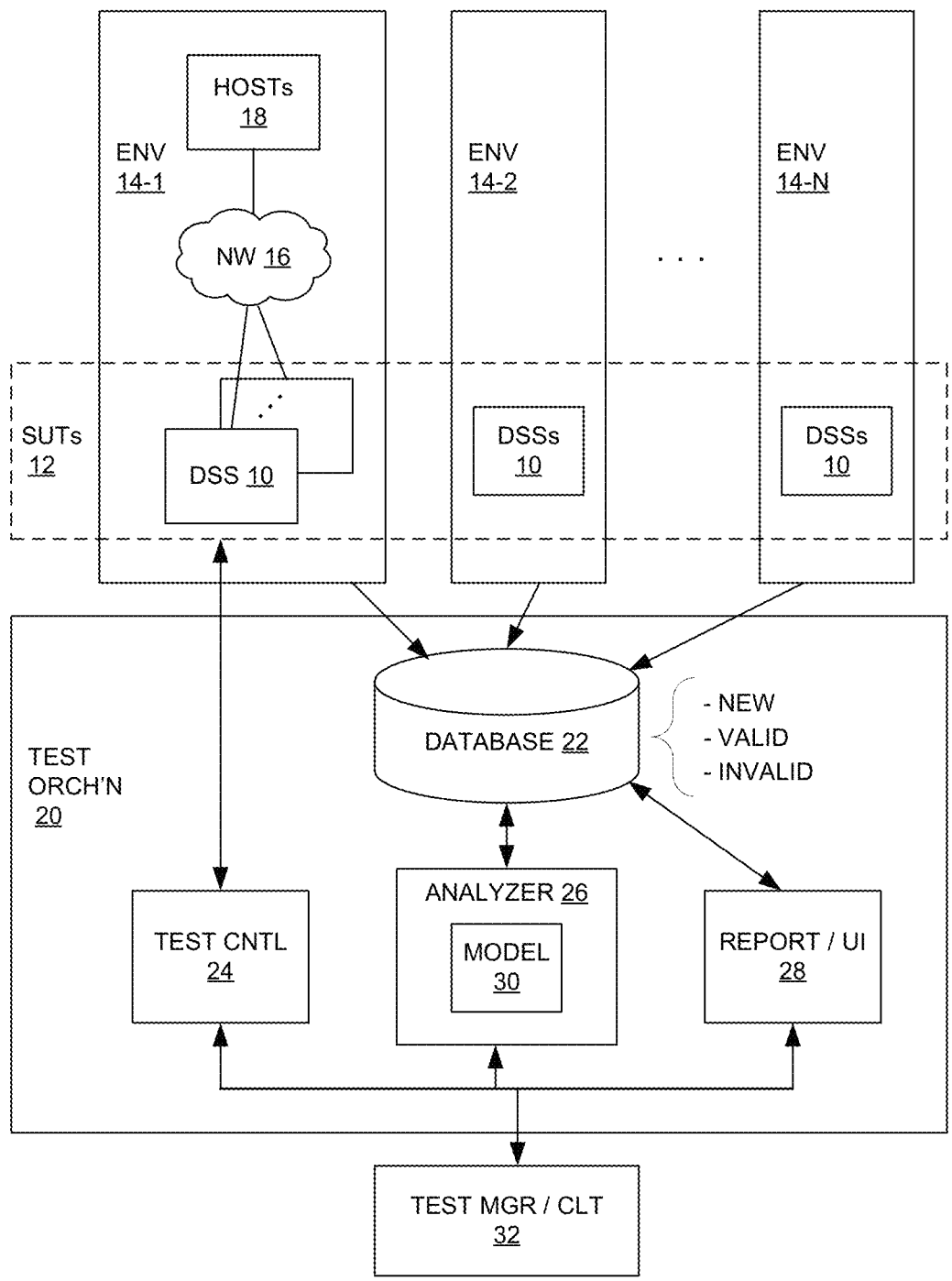
FIG. 1 is a block diagram of a testing system for performance testing data storage systems.

FIG. 1 shows a test system for testing data storage systems (DSSs) 10, which are also referred to herein as "systems under test" or SUTs 12. The test system includes the SUTs 12 in respective operating environments (ENVs) 14, each having one or more networks (NW) 16 to which the corresponding DSSs 10 are connected as well as one or more host computers (HOSTs) 18. The SUTs 12 are also in communication with components of a test orchestration (ORCH'N) system 20 which includes various components as shown: a database 22, a test control component (test controller) 24, an analyzer component (analyzer) 26, and report/UI component (Report/UI) 28. The analyzer 26 employs a model component (model) 30. A test manager or client node (MGR/CLT) 30 is communicatively coupled to the test controller 24, analyzer 26 and Report/UI 28 for overall control and monitoring by a human test administrator.

The different environments 14 (shown as 14-1, 14-2, . . . , 14-N) represent some of a large variety of real-world deployments for the DSSs 10. The following are example variations that can be captured across the environments 14 and DSSs 10 under test:

- Different physical DSS hardware (number of CPU, number of drives)
- Different DSS connectivity (Ethernet, Fibre Channel, HCI)
- Different DSS Frontend Protocol (SCSI, NVME)
- Different number/mix of DSSs in different environments 14
- Different host types (e.g., virtual environment, database, raw device, etc.)

In operation, the hosts 18 execute test programs to generate a workload of data storage requests to the corresponding DSSs 10, under the control of the test controller 24. During test execution, the DSSs 10 generate a variety of pertinent data, which is copied into the database 22 to enable the test orchestration system 20 to perform post-execution operations, specifically by the analyzer 26 and Report/UI 28, and all as described further below. This data is referred to as test result data or simply "test results" herein. As indicated in FIG. 1, the stored performance results are of three types—New, Valid and Invalid. New results are from tests that have been executed but have not yet been analyzed by analyzer 26. Upon performing analysis, the analyzer 26 labels results as either Valid or Invalid, thereby incorporating the results into respective collections. In particular, the labeling of results as Valid serves to incorporate the test results into a collection of validated test results that are deemed to accurately reflect the actual performance characteristics of the SUTs 12, and thus may be used in connection with higher-level activities such as confirming compliance with service level agreements (SLAs), benchmarking, version regression, hardware qualification, etc.

Testing preferably involves executing a variety of workloads that collectively provide meaningful insight into overall performance. For example, different workloads can present different mixes of reads and writes, and also different mixes of request size (i.e., the amount of data being read/written by each request). Request sizes can range from as small as 1 KB to 1 MB or greater. Also, workloads present different overall degrees of loading, as represented by data throughput (MB/Sec) or I/O request rate (I/Os per second, or "IOPS"). Thus tests may be performed at increments of 10% of these values, for example (i.e., 10%, 20%, ..., 100% and even higher). Additionally, the test system preferably exercises the SUTs 12 over some period with a corresponding large number of tests, which mimics a period of regular real-world operation. All of these testing features contribute to the large volume of test result data that requires analysis before the test results can be deemed valid and thus representative of DSS performance.

Figure 2A:
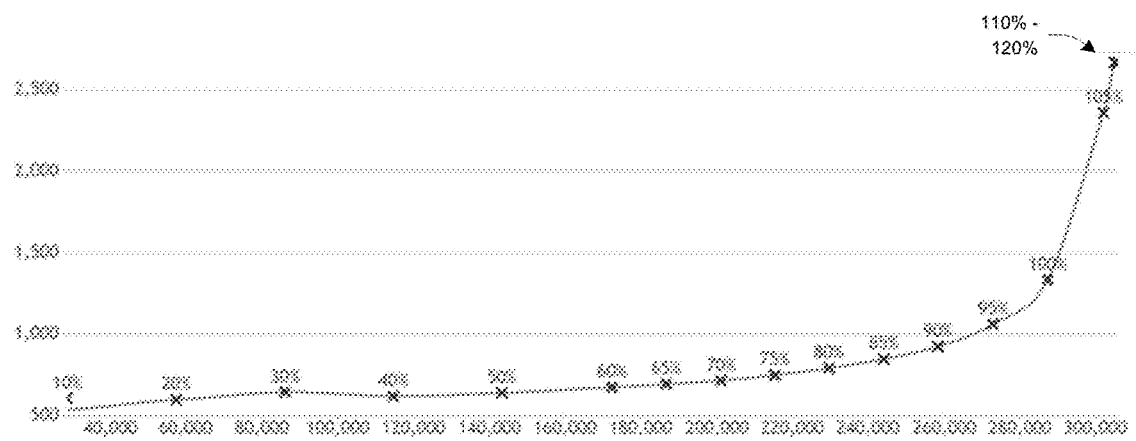
FIGS. 2A through 2C are plots of performance test results.
Figure 2B:
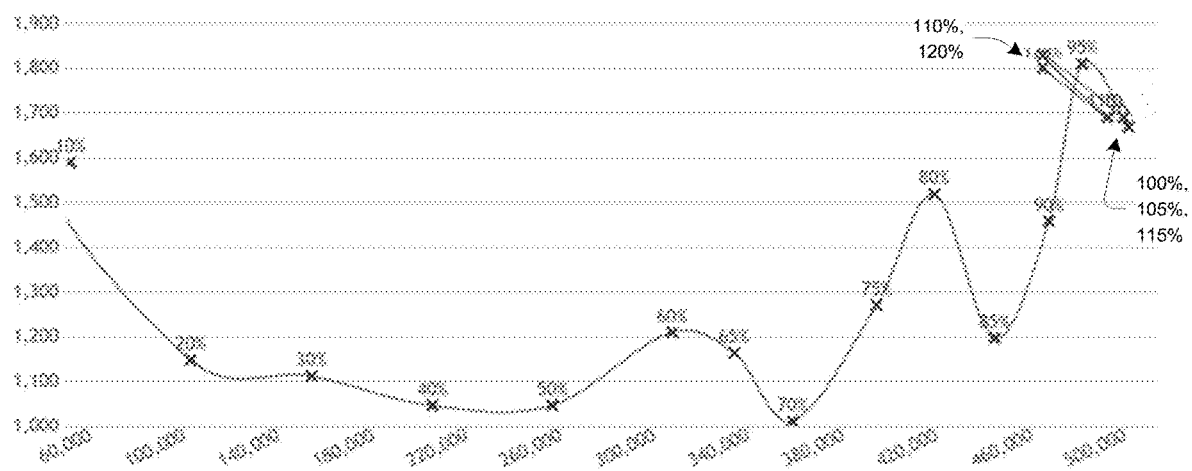
Figure 2C:
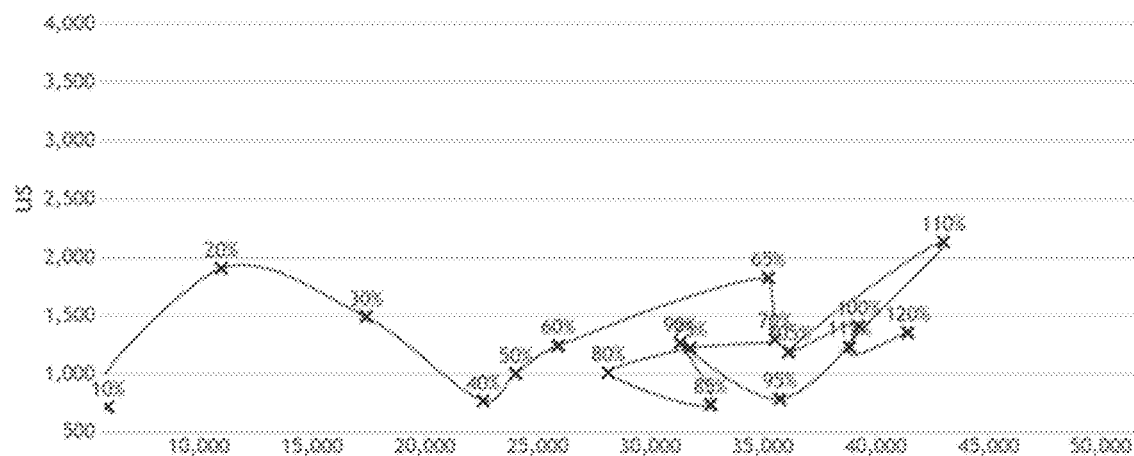

FIGS. 2A through 2C present different example sets of performance test results, illustrating the task of identifying test results as either valid or invalid. Each of these is a plot of latency (in uS) versus I/Os per second (IOPS), with each point also labelled as a percentage of maximal IOPS workload. FIG. 2A presents idealized results which exhibit a polynomial characteristic, with latency rising slowly with increasing workload up to a "knee" at about 290K IOPS (~97%), after which latency rises much more steeply. FIG. 2B is plot of more real-world results for a certain workload, generally following the polynomial characteristic, while FIG. 2C is a plot of results that so differ from those of FIG. 2A that they cannot provide any meaningful measure of performance. These plots show the need for, and challenge of, assessing the validity of performance test results before they are taken as representative of actual performance of a SUT 12.

Figure 3:
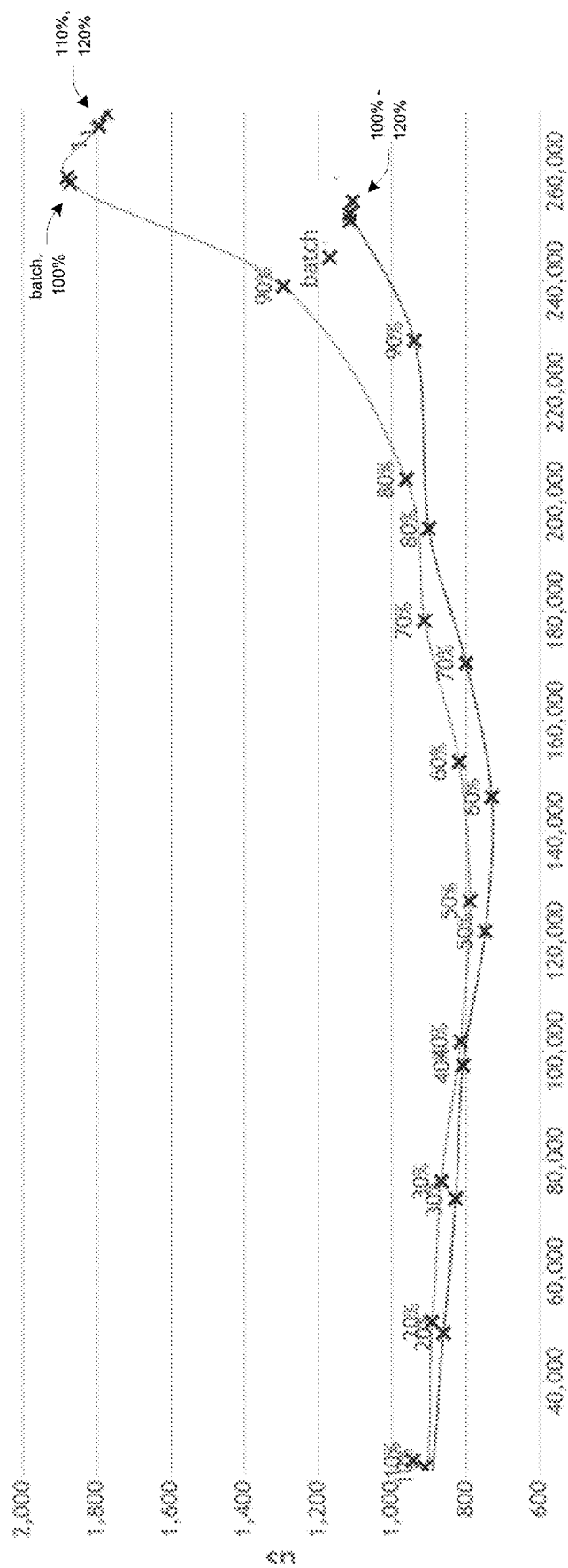
FIG. 3 is a plot of two sets of performance test results for comparison.

FIG. 3 presents the task as comparing two sets of performance result data, one being current test results (e.g., the upper curve) and the other being past valid results (lower curve). One way to assess the quality of a set of test results is to determine how similar they are to a set of test results that have been validated or otherwise taken as a meaningful standard of comparison.

As described more below, the analyzer 26 (FIG. 1) employs a model 30 that incorporates a variety of operating parameters and variables of the SUTs 12. Additionally, given the type of performance results being analyzed, i.e., sets of results that can be interpreted as performance curves like those in FIGS. 2A-2C and 3, the model 30 also incorporates certain measures of the test result data that help to distinguish results on this basis as well, i.e., as to how well they match either an idealized or past performance curve that is taken as a standard of comparison. In one embodiment, the following three measures are used:

1. Average Point Weight (APW): A calculated APW per curve, in which a weight function is used to grade each curve point based on Latency and IOPS. The APW measure reflects the quality of the "knee" in the curve, i.e., the essential inflection point at or near maximum workload. Using APW promotes efficiency in grading and learning performance data curves and regression patterns.

curve point → $p = (\text{latency}, \text{iops})$ $$\frac{1}{len(curve)} \left( \sum_{i=0}^{i=len(curve)} F_{weight}(p_i) \right)$$

$$F_{weight}(p) = \frac{iops}{\sqrt{latency}}$$

2. Average distance: A calculated average of average distance between adjacent point on each curve.

curve point → $p = (\text{latency}, \text{iops})$ $$\frac{1}{len(curve)} \left( \sum_{i=1}^{i=len(curve)} dist(p_i, p_{i-1}) \right)$$

$$dist(p_1, p_2) = \sqrt{(latency_1 - latency_2)^2 + (iops_1 - iops_2)^2}$$

Figure 4:
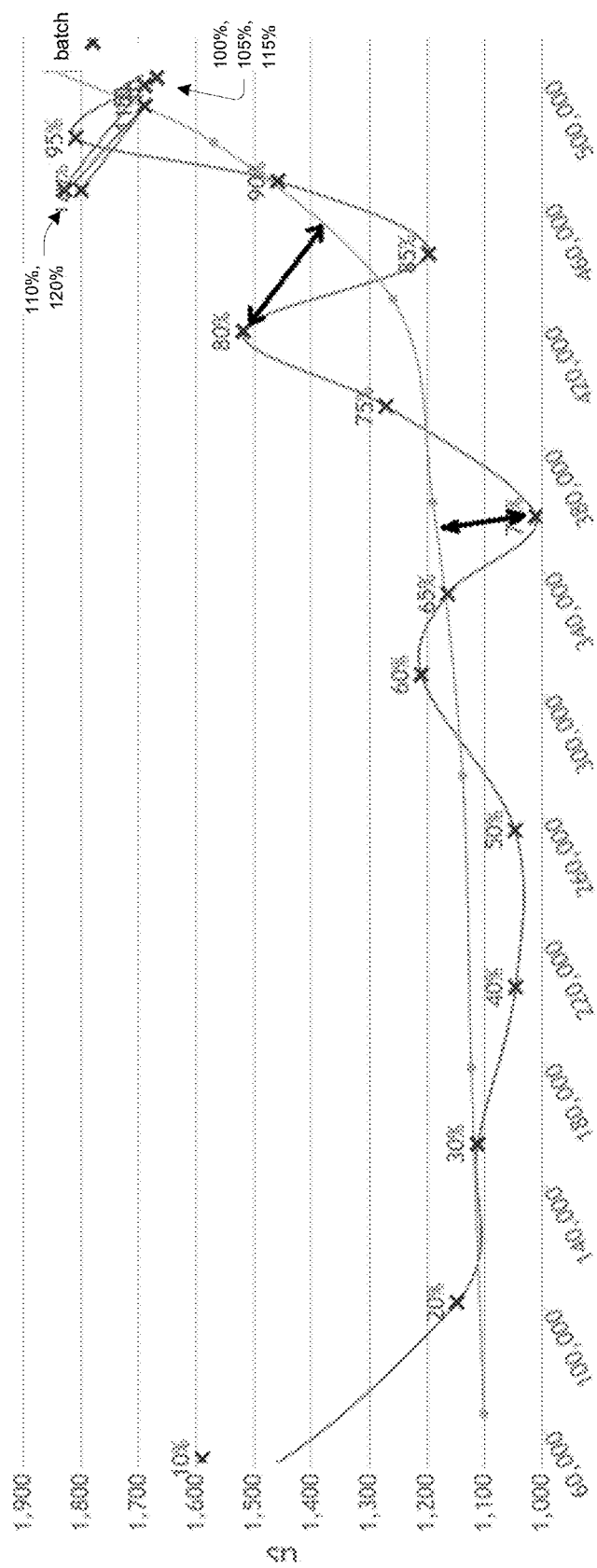
FIG. 4 is a plot of performance test results illustrating distance measurement.

3. Distance from polynomial (FIG. 4)—A calculated average distance from a second degree polynomial function that is best fit for the curve points. This calculation is generally a summation of difference values for all corresponding points of the curve and the polynomial function, as illustrated in FIG. 4 (see arrows at example locations).

Figure 5:
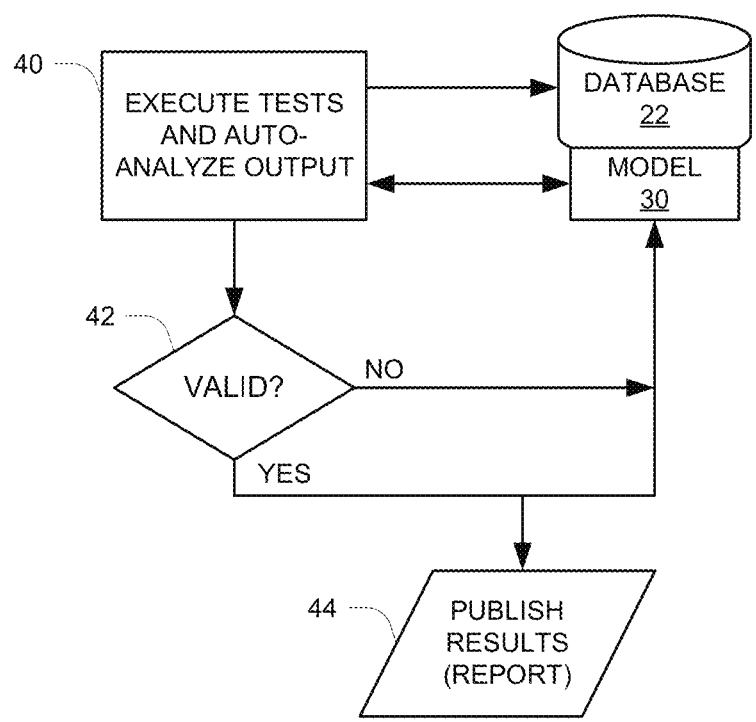
FIG. 5 is a simplified schematic/flow diagram of test and analysis operation.

FIG. 5 presents a simplified schematic/flow diagram of operation of the test system. At 40, a set of performance tests are executed by the SUTs 12 under control of the test controller 24, and the test results (which have been stored in the database 22) are auto-analyzed by analyzer 26 using the model 30. The analysis generates a binary output—Valid or Invalid, which is arrived at by comparing a numerical output from the model 30 to a predetermined threshold value. In one example the output from model 30 is a numerical grade value in the range of 0 to 1 indicating the degree to which the results match the expectation as reflected in the training of the model (described more below). The threshold is tuned to provide a desired biasing of validation for corner cases, such as preferring to minimize false positive rate at the expense of higher false negative rate. In that example, the threshold may be set well above 0.5 (e.g., 0.7 or higher). The threshold may be a tunable parameter that can be varied by the test administrator.

Thus at 42, the process compares the model output with the threshold to determine whether the set of test results is valid (model output exceeding threshold). If so, then the validated test results are "published", i.e., incorporated into the larger set of validated test results across time that are taken as representative of the performance of the SUTs 12. Another aspect of publishing may be displaying test results to a human test administrator via the test manager/client 32 along with an indication of validity. Optionally, the system may include tools enabling the test administrator to examine test results in some way that can help to confirm the auto-analysis results, such as displaying a measured performance curve versus the historically established standard, perhaps with annotation or other graphical enhancement corresponding to the manner of analysis (e.g., displaying the above three measures).

Once a given set of test results has been evaluated as described above, the analysis results themselves are added to the database 22 so as to contribute to the future operation of the model 30. Thus both paths from the test step 42 lead back to the model 30, and it will be appreciated that there is a looping behavior corresponding to successive sessions of test execution and analysis. The difference between the two paths is that the validated results are published at 44 only for the Yes path, while this is not done on the No path.

In one embodiment the model 30 is a machine learning model in the form of a random forest regressor, which as generally known is an ensemble-type of model employing a number of random tree regressors whose outputs are combined to generate a final model output. The tree regressors function as classifiers, and they are trained on historical data to predict the validity of test results. One benefit of this type of model is its resistance to over-training or over-fitting, thus providing greater accuracy in the face of quite variable test result data over time. Specifics of the training and use of the model 30 are given more below.

Figure 6:
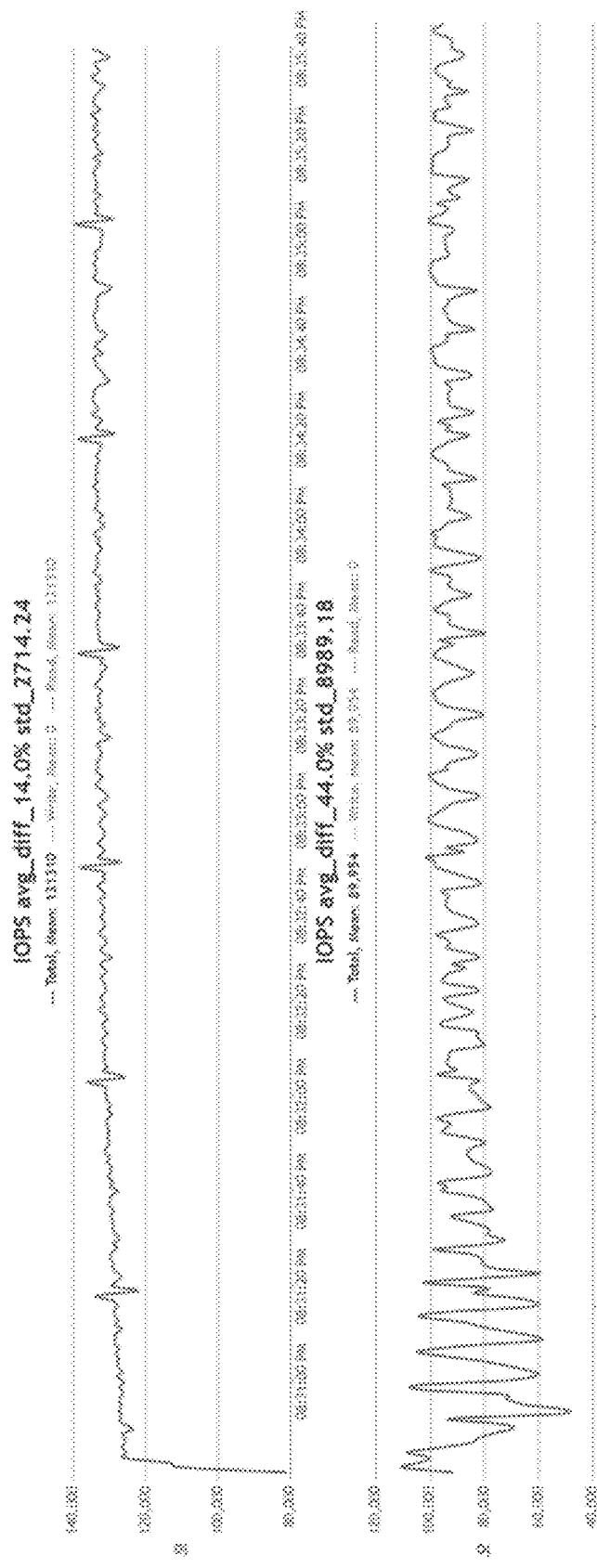
FIG. 6 is pair of plots of IOPS standard deviation over time.

In addition to the three measures described above, in some embodiments it may be desirable to incorporate additional measures or other derived values. In one example, a calculated performance value "cycles per byte" can be used:

$$CPB = \frac{cpu\_cycles_{avg} * truck\_util_{avg}}{bandwidth_{avg}[bytes]}$$

where "truck_util" refers to the fractional utilization of a CPU core on which the test is executed. FIG. 6 shows another potentially useful measure, which is workload (IOPS) standard deviation over time. The upper curve shows a set of results with a standard deviation of 14%, while the lower curve shows results with a standard deviation of 44%. These measures can also contribute to an accurate classification of test results by the model 30.

Figure 7:
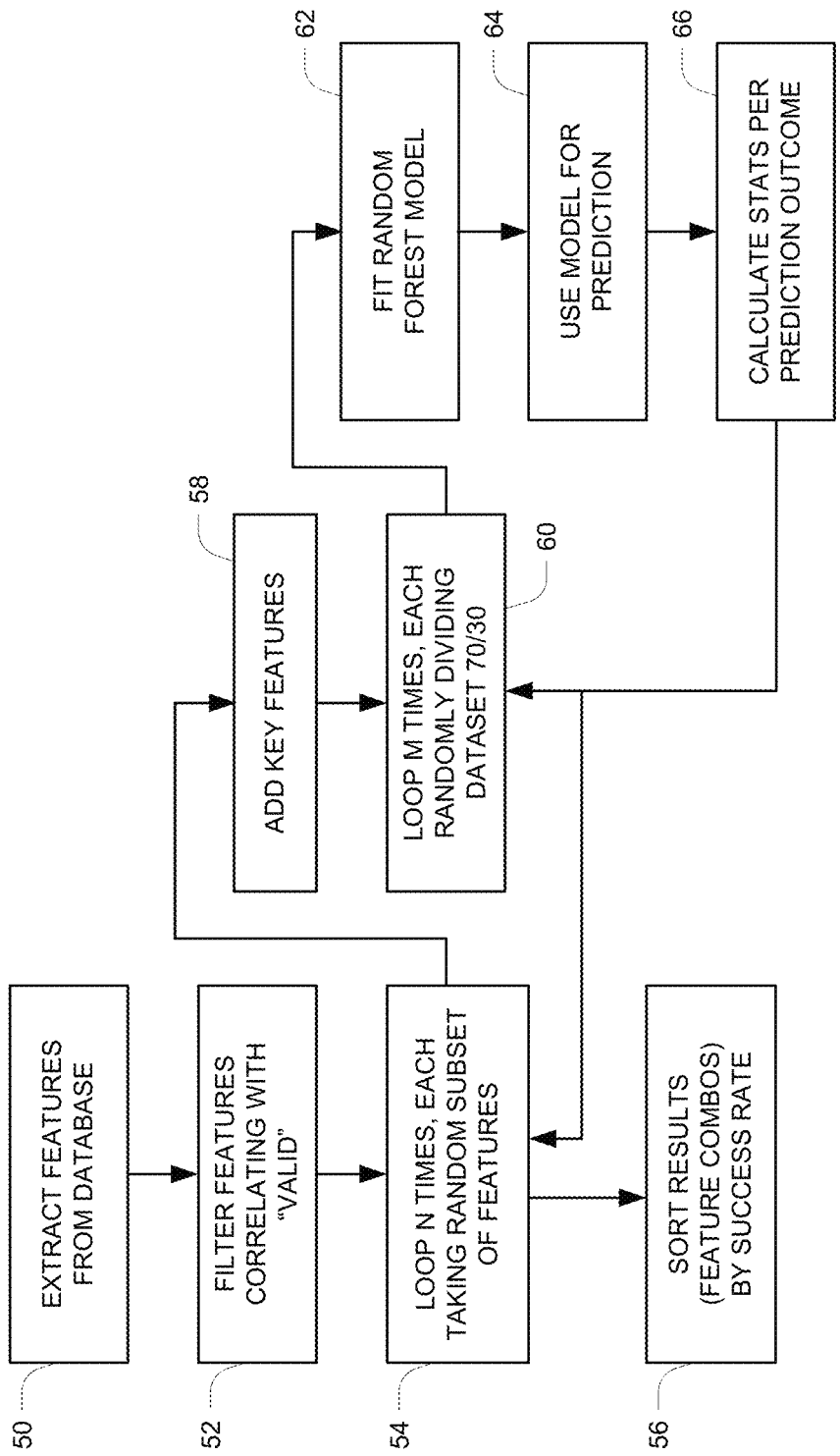
FIG. 7 is a flow diagram of model training and use.

FIG. 7 illustrates the training and use of the model 30 in the auto-analysis process as described above. At 50, the process extracts all recorded values (features) for a given set of tests from the database 22. At 52 is a filtering operation to keep only those features that correlate with the validity indicator "Valid", i.e., those features that can actually contribute to determining validity. Step 54 represents a first or outer loop point, in which each iteration begins with taking a random subset of the filtered features. As an example, if the feature set size is on the order of 100 features, each iteration might focus on 20 features selected at random. The number of iterations is represented as N. Once all iterations are complete, at 56 the results (feature combinations) are sorted by success rate, which is calculated in the inner loop as described below.

Each iteration of the output loop represented by step 54 includes a step 58 of adding additional key features that are calculated from the data for the selected features. The three measures described above (APW, average distance, and distance from polynomial) are examples of such added features. Then at 60 is a begin point for an inner loop that is repeated some number M times. In each iteration, the dataset is randomly divided into training and test portions. In one example as shown, this division may be 70/30, i.e., 30% of the data is taken for training and 70% for subsequent analysis. Then at 62 is a training step in which the random forest model is fitted based on the training data, and at 64 the remainder (analysis) data is applied to the model to generate a model output, as described above. At 66 is a set for calculating statistics on prediction outcomes. Once all M iterations of this inner loop have completed, the process escapes to the outer loop at 54, and once all N outer loop iterations have completed, step 56 is executed and the process is complete.

Each DSS 10 includes a performance monitor that collects local feature values and updates the database 22 during operation. As mentioned, the performance tests may run in a loop over a range of block sizes and read ratios. Each test case contains three phases, with the test cases being for example [8 k-all_read, 8 k-all_write, 8 k-half-read-half-write]:

Thread curve, to find optimal number of threads to run for the test case (this is done by successively adding execution threads until reaching a point where an additional thread reduces performance Paced curve, which is the actual performance test that measures latency vs IOPS, from which the values APW curve, avg-dst-curve, etc. are calculated Batch sample, default 5 minutes, measuring performance over time:
  ☐_avg—average over the sample
  ☐_var—sample variance
  ☐_diff—max(abs(mean(sample)−max(sample)), mean (sample)−min(sample))

The following is a list of example features that may be used in connection with the model 30 and analysis as described above.

| | |
|---|---|
| Ssds | Solid State Drives (SSDs) |
| Ssds_size | SSD size |
| Ports_Speed | Port speed (e.g., 1 Gb/s Ethernet) |
| Sas_Drives | SAS drives |

| | |
|---|---|
| Block_Size | Block size |
| rratio | Read ratio |
| seekpct | Seek percentage |
| RAID | RAID type |
| compression | Compression in use |
| cores | Number of CPU cores |
| EX_type | DSS type, especially CPU type/organization |
| APW_curve | APW measure |
| threads | Number of threads |
| jitter | Workload jitter/standard deviation |
| avg_dst_curve | Average distance curve |
| polinom_dst_curve | Polynomial distance curve |
| ecpb | Estimated cycles per byte (CBP) |
| dedup | Deduplication |
| active_data_set | Size of address space used for testing DSS |
| Ports | Number of port |
| prefill | Amount (e.g., %) of total physical data capacity to fill before test (pre-condition) |
| cl_ibid | Code version |
| Volume_Num | Volume number |
| Volume_Size | Volume size |
| Truck_nodeA_avg | CPU utilization flush/write node A, average |
| Truck_nodeB_avg | CPU utilization flush/write node B, average |
| Xenv_nodeA_avg | CPU utilization datapath node A, average |
| Xenv_nodeB_avg | CPU utilization datapath node B, average |
| Xenv_nodeA_var | CPU utilization datapath node A, variance |
| Xenv_nodeB_var | CPU utilization datapath node B, variance |
| TurboMon_0_RAMWatt_A_avg | CPU power consumption node A, average |
| TurboMon_1_RAMWatt_B_avg | CPU power consumption node B, average |
| TurboMon_0_RAMWatt_A_var | CPU power consumption node A, variance |
| TurboMon_1_RAMWatt_B_var | CPU power consumption node B, variance |
| TurboMon_0_Avg_MHz_A_avg | CPU speed node A, average |
| TurboMon_1_Avg_MHz_B_avg | CPU speed node B, average |
| VolumePerfMon_latency_diff | Volume latency, difference |
| VolumePerfMon_iops_diff | Volume IOPS, difference |
| VolumePerfMon_BW_diff | Volume bandwidth, difference |
| VolumePerfMon_iops_var | Volume latency, variance |
| VolumePerfMon_latency_var | Volume IOPS, variance |
| VolumePerfMon_BW_var | Volume bandwidth, variance |

While various embodiments of the invention have been particularly shown and described, it will be understood by those skilled in the art that various changes in form and details may be made therein without departing from the scope of the invention as defined by the appended claims.

What is claimed is:

1. A method of performance testing a data storage system in a test system having a test orchestration system and a plurality of operating environments, each operating environment including a respective set of data storage systems as systems under test and a respective set of host computers for executing performance tests to generate corresponding workloads for the data storage systems, the test orchestration system containing a database, an analyzer, and a test controller, the method comprising steps, performed by co-operation of the database, analyzer and test controller of the test orchestration system, of:

recording operating parameters and performance data of the data storage system as it executes a plurality of performance tests over a test period, the performance data including one or more measures of a performance characteristic across a range of I/O operation rates or I/O data rates for each of the performance tests;

selecting subsets of recorded operating parameters and performance data and applying the selected subsets to a machine learning model to train the model and to use the model as trained, the model providing a model output indicative for each performance test of a level of validity of the corresponding performance data; and based on the model output indicating at least a predetermined level of validity for a given performance test, incorporating the performance data for the performance test into a record of validated performance data for the data storage system, wherein measures of recorded performance data are calculated and applied to the model along with the corresponding performance data, the measures including at least an average point weight measure reflecting a weighted average value of a performance measure across the range of I/O operation rates or I/O data rates for a corresponding performance test, and wherein the measures further include (1) an average distance between adjacent values of the performance parameter and (2) a calculated average distance from a second degree polynomial function being a best fit for the values of the performance parameter.

2. The method of claim 1, wherein the average point weight measure employs a weight for each value of the performance measure equal to the quotient of an I/O operation rate or I/O data rate divided by the square root of the value.

3. The method of claim 1, further including comparing the model output with a predetermined threshold value corresponding to the predetermined level of validity, the threshold value.

4. The method of claim 1, wherein the model is a random forest regressor machine learning model employing a number of random tree regressors whose outputs are combined to generate a final model output.

5. The method of claim 4, wherein training and use of the model includes:
- a filtering operation to keep only those recorded operating parameters and performance data that correlate with the predetermined level of validity;
- an iterated outer loop in which each iteration begins with selecting a random subset of the results of the filtering operation, and further includes adding measures that are calculated from the data for the selected results; and
- an iterated inner loop in which each iteration includes randomly dividing the selected random subset into training and test portions, followed by a training step in which the model is fitted based on the training portion, and a use step in which the test portion is applied to the model to generate the model output.

6. The method of claim 5, wherein the measures calculated from the data for the selected results include average point weight, average distance, and distance from polynomial.

7. The method of claim 1, wherein the performance tests run in a loop over a range of data block sizes and read ratios, as well as multiple test cases corresponding to respective different mixes of reads and writes.

8. The method of claim 7, wherein each test case executes in multiple phases including a thread curve phase and a paced curve phase, the thread curve phase including progressively adding additional execution threads to identify an optimal number of threads to use for execution in the paced curve phase, the paced curve phase including progressively increasing the I/O operation rates or I/O data rates across the range so as to obtain the performance data.

9. The method of claim 8, wherein the multiple phases further include a batch sample measuring performance over time, including for each sample (i) an average over the sample, (ii) a sample variance, and (iii) a difference value being a difference between the average and either a maximum or a minimum of the sample.

10. The method of claim 1, wherein the performance testing includes one or more of regression testing, build promotion testing, and operation testing.

11. A test system for performance testing a data storage system, comprising:
- a plurality of operating environments each including a set of data storage systems as systems under test and a set of host computers for executing performance tests to generate corresponding workloads for the data storage systems; and
- a test orchestration system containing a database, an analyzer, and a test controller, co-configured and operative to perform a testing method including:
- recording operating parameters and performance data of the data storage system as it executes a plurality of performance tests over a test period, the performance data including one or more measures of a performance characteristic across a range of I/O operation rates or I/O data rates for each of the performance tests,
- selecting subsets of recorded operating parameters and performance data and applying the selected subsets to a machine learning model to train the model and to use the model as trained, the model providing a model output indicative for each performance test of a level of validity of the corresponding performance data; and
- based on the model output indicating at least a predetermined level of validity for a given performance test, incorporating the performance data for the performance test into a record of validated performance data for the data storage system,
- wherein the testing method further includes calculating measures of recorded performance data and applying the calculated measures to the model along with the corresponding performance data, the measures including at least an average point weight measure reflecting a weighted average value of a performance measure across the range of I/O operation rates or I/O data rates for a corresponding performance test,
- and wherein the measures further include (1) an average distance between adjacent values of the performance parameter and (2) a calculated average distance from a second degree polynomial function being a best fit for the values of the performance parameter.

12. The test system of claim 11, wherein the average point weight measure employs a weight for each value of the performance measure equal to the quotient of an I/O operation rate or I/O data rate divided by the square root of the value.

13. The test system of claim 11, wherein the testing method performed by the test orchestration system further includes comparing the model output with a predetermined threshold value corresponding to the predetermined level of validity, the threshold value.

14. The test system of claim 11, wherein the model is a random forest regressor machine learning model employing a number of random tree regressors whose outputs are combined to generate a final model output.

15. The test system of claim 14, wherein training and use of the model includes:
- a filtering operation to keep only those recorded operating parameters and performance data that correlate with the predetermined level of validity;
- an iterated outer loop in which each iteration begins with selecting a random subset of the results of the filtering operation, and further includes adding measures that are calculated from the data for the selected results; and
- an iterated inner loop in which each iteration includes randomly dividing the selected random subset into training and test portions, followed by a training step in which the model is fitted based on the training portion, and a use step in which the test portion is applied to the model to generate the model output.

16. The test system of claim 15, wherein the measures calculated from the data for the selected results include average point weight, average distance, and distance from polynomial.

17. The test system of claim 11, wherein the performance tests run in a loop over a range of data block sizes and read ratios, as well as multiple test cases corresponding to respective different mixes of reads and writes.

18. The test system of claim 17, wherein each test case executes in multiple phases including a thread curve phase and a paced curve phase, the thread curve phase including progressively adding additional execution threads to identify an optimal number of threads to use for execution in the paced curve phase, the paced curve phase including progressively increasing the I/O operation rates or I/O data rates across the range so as to obtain the performance data.

19. The test system of claim 18, wherein the multiple phases further include a batch sample measuring performance over time, including for each sample (i) an average over the sample, (ii) a sample variance, and (iii) a difference value being a difference between the average and either a maximum or a minimum of the sample.

20. The test system of claim 11, wherein the performance testing includes one or more of regression testing, build promotion testing, and operation testing.

* * * * *